United States Patent
Ishaq et al.

(10) Patent No.: US 9,177,485 B2
(45) Date of Patent: Nov. 3, 2015

(54) METHOD AND SYSTEM FOR AUTOMATICALLY GENERATING QUESTIONS FOR A PROGRAMMING LANGUAGE

(75) Inventors: Alsaad Ishaq, Uttar Pradesh (IN); Satheesha Byadarahally Nanjappa, Mysore (IN); Seema Acharya, Maharashtra (IN)

(73) Assignee: Infosys Limited (IN)

( * ) Notice: Subject to any disclaimer, the term of this patent is extended or adjusted under 35 U.S.C. 154(b) by 1263 days.

(21) Appl. No.: 12/319,566

(22) Filed: Jan. 8, 2009

(65) Prior Publication Data

US 2009/0280456 A1 Nov. 12, 2009

(30) Foreign Application Priority Data

Jan. 11, 2008 (IN) .............................. 104/CHE/2008

(51) Int. Cl.
*G09B 19/00* (2006.01)
*G09B 7/00* (2006.01)

(52) U.S. Cl.
CPC .............. *G09B 19/0053* (2013.01); *G09B 7/00* (2013.01)

(58) Field of Classification Search
CPC .................................. G09B 19/00; G09B 7/00
USPC .......................... 434/118, 322, 323, 350, 353
See application file for complete search history.

(56) References Cited

U.S. PATENT DOCUMENTS

| | | | | |
|---|---|---|---|---|
| 4,661,073 A * | 4/1987 | Smart | ........................... | 434/222 |
| 5,259,766 A * | 11/1993 | Sack et al. | .................... | 434/362 |
| 5,456,607 A * | 10/1995 | Antoniak | ...................... | 434/323 |
| 5,490,249 A * | 2/1996 | Miller | ........................ | 714/38.14 |
| 5,565,316 A * | 10/1996 | Kershaw et al. | .............. | 434/322 |
| 5,652,835 A * | 7/1997 | Miller | ........................ | 714/38.14 |
| 5,749,736 A * | 5/1998 | Griswold et al. | ............. | 434/322 |
| 5,775,918 A * | 7/1998 | Yanagida et al. | ............. | 434/353 |
| 5,902,114 A * | 5/1999 | Erickson | ....................... | 434/188 |
| 5,978,784 A * | 11/1999 | Fagg et al. | ....................... | 706/45 |
| 6,000,945 A * | 12/1999 | Sanchez-Lazer et al. | .... | 434/322 |
| 6,018,617 A * | 1/2000 | Sweitzer et al. | ............. | 358/1.15 |
| 6,101,490 A * | 8/2000 | Hatton | ........................... | 706/55 |
| 6,108,515 A * | 8/2000 | Freeman | ....................... | 434/321 |
| 6,112,051 A * | 8/2000 | De Almeida | .................. | 434/362 |
| 6,270,352 B1 * | 8/2001 | Ditto | ............................ | 434/118 |
| 6,315,572 B1 * | 11/2001 | Owens et al. | ................. | 434/322 |
| 6,353,925 B1 * | 3/2002 | Stata et al. | .................... | 717/112 |
| 6,413,100 B1 * | 7/2002 | Dickmeyer et al. | ........... | 434/322 |
| 6,442,370 B1 * | 8/2002 | Driscoll et al. | ............... | 434/350 |
| 6,511,326 B1 * | 1/2003 | Galanter et al. | .............. | 434/322 |
| 6,569,012 B2 * | 5/2003 | Lydon et al. | ...................... | 463/9 |
| 6,688,889 B2 * | 2/2004 | Wallace et al. | ............... | 434/322 |
| 7,523,045 B1 * | 4/2009 | Walker et al. | ................ | 705/7.14 |

(Continued)

*Primary Examiner* — Timothy Musselman
*Assistant Examiner* — Alvin Carlos
(74) *Attorney, Agent, or Firm* — Lerner, David, Littenberg, Krumholz & Mentlik, LLP

(57) ABSTRACT

The present invention provides a method, system and computer program product for generating a family of questions for a programming language. Generating the family of questions includes the generation of various questions from a particular compilable code, and the corresponding options for the questions. The options include various correct and incorrect options for the questions.

12 Claims, 6 Drawing Sheets

(56) References Cited

U.S. PATENT DOCUMENTS

| | | | |
|---|---|---|---|
| 8,038,448 B2 * | 10/2011 | Kallander | 434/323 |
| 8,132,156 B2 * | 3/2012 | Malcolm | 717/124 |
| 8,202,097 B1 * | 6/2012 | Brittingham et al. | 434/322 |
| 2002/0127521 A1 * | 9/2002 | Fegan | 434/118 |
| 2002/0184265 A1 * | 12/2002 | Gupta | 707/513 |
| 2003/0113699 A1 * | 6/2003 | Johnson et al. | 434/323 |
| 2004/0234936 A1 * | 11/2004 | Ullman et al. | 434/322 |
| 2004/0253569 A1 * | 12/2004 | Deane et al. | 434/178 |

* cited by examiner

METHOD AND SYSTEM FOR AUTOMATICALLY GENERATING QUESTIONS FOR A PROGRAMMING LANGUAGE

BACKGROUND OF THE INVENTION

The present invention relates generally to question banks. More specifically, it relates to a method and system for automatically generating questions for a programming language in the question bank.

Today, software-based organizations and educational institutions are building up comprehensive infrastructure to train and evaluate their existing employees, new recruits and students. This training plays a vital role in enhancing the technical and soft skills of employees and students, who are trained on various programming languages, which require timely assessment.

A typical question for an examinee taking an examination comprises a code that can be compiled. There are several options from which the examinee has to select the correct one. Further, the question bank contains questions in various formats such as multiple choice questions, matrix questions, etc., on which the examinee is tested.

Various formats of questions are manually created and are regularly updated in the question bank. Since the number of questions in the question bank is limited, over a period of time the examinees become aware of the questions in the question bank. Further, it becomes easy for the examinee to memorize or guess the correct options for the questions without actually solving them.

Different sets of questions may be provided to examinees who are sitting near each other to reduce the possibility of their cheating from one another. This results in a difference in the difficulty level of questions in the different sets and does not assess the examinees on the same parameters.

Furthermore, incorrect options are generated for the questions, to enable the examinees to select the correct option from a set of options provided for each question. These incorrect options are quite different from the correct options, and the examinees may be able to guess the correct options easily.

In light of the foregoing discussion, there is a need for a method for updating the question bank automatically. The method should generate and populate the question bank with an unlimited number of unique questions. Further, the method should help in reducing the time required to generate the questions. The method should also help in generating correct and incorrect options for the questions, such that examinees can be evaluated for their skills and knowledge effectively.

BRIEF SUMMARY OF THE INVENTION

An object of the invention is to generate a family of questions for a programming language.

Another object of the invention is to generate one or more questions from a particular compilable code.

Yet another object of the invention is to generate corresponding options for each question.

To achieve the objectives mentioned above, the invention provides a method, a system and a computer program product for generating a family of questions for a programming language. The family of questions includes one or more questions, which are generated from a template question. The template question includes a compilable code with one or more variables, which are defined by a user. The method enables the assignment of a first set of unique random values in the variables in the template question to generate one or more questions. Further, a plurality of options is generated that correspond to each question. Each option includes at least one correct option and at least one incorrect option for each question.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION

Various embodiments of the present invention provide a method and a system for generating a family of questions for a programming language. In various embodiments of the invention, the programming language may be C, C++, C#, JAVA, UNIX, Visual Basic, VC++, COBOL, FORTRAN, and the like. The family of questions contains various questions that are formed by using the same compilable code and the corresponding options for the questions.

Figure 1:
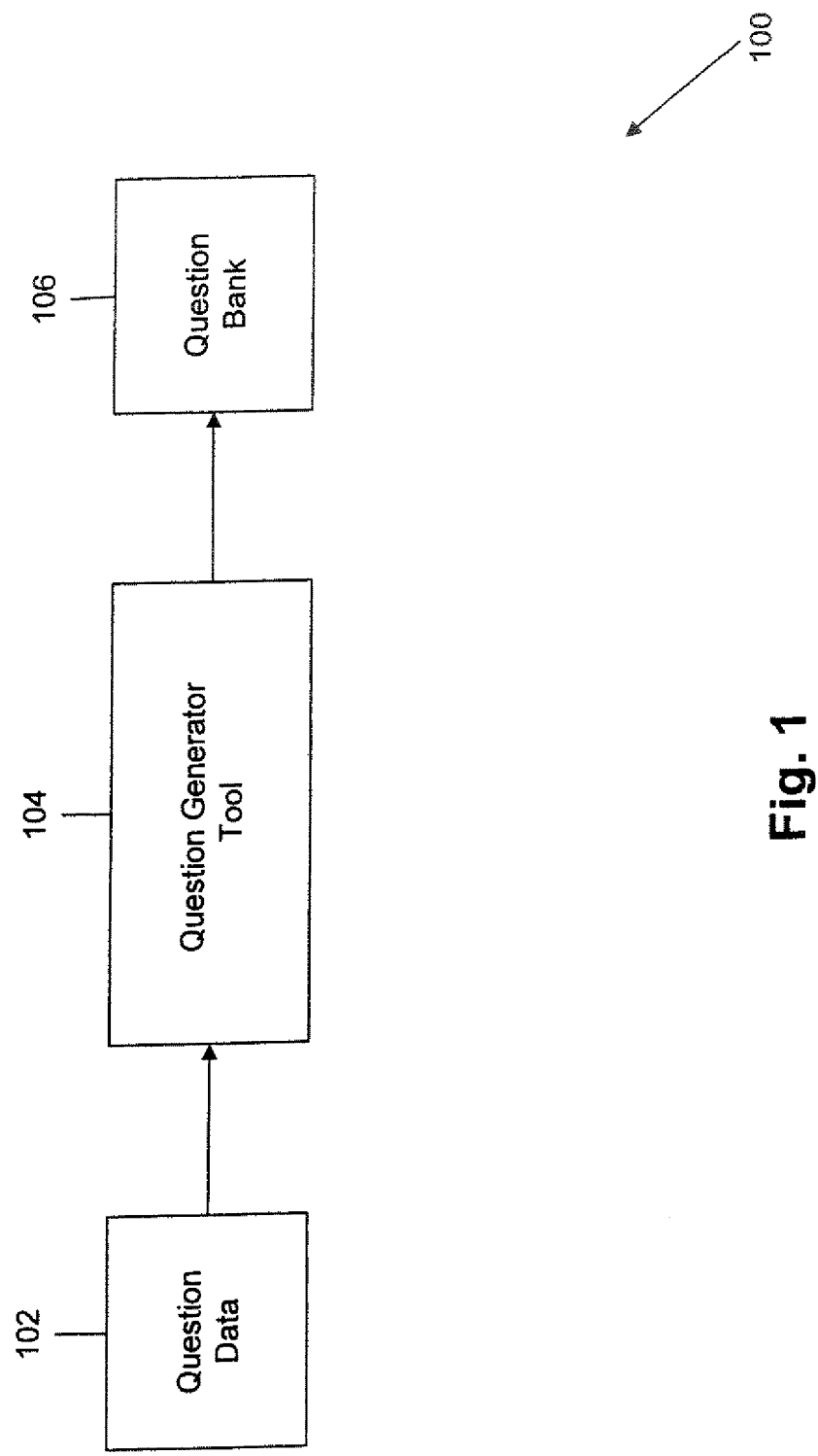
FIG. 1 is a block diagram illustrating an environment, in which various embodiments of the present invention may be practiced.

FIG. 1 is a block diagram illustrating an environment 100, in which various embodiments of the invention may be practiced. Environment 100 includes a question data 102, a question generator tool 104 and a question bank 106.

Question data 102 includes various details that are required for question generator tool 104 to generate questions. Further, the questions generated by question generator tool 104 are stored in question bank 106. Question bank 106 presents the questions to examinees in various formats.

The details included in question data 102 may be a set of compliable codes, a set of pre-defined parent questions containing the compilable codes, parent questions converted to the form of a template, types of question formats, rules for generating questions, rules for generating options for the questions, the number of questions to be generated, the number of correct and incorrect options to be generated, and the like. In an embodiment of the invention, the details are provided by a user.

The various types of question formats may be multiple choice questions, matrix questions, match-the-column questions, multiple response questions, a combination thereof, and the like.

In multiple choice questions, a question with few options is provided to an examinee. The options include a correct option and various incorrect options for the compilable code present in the question. The examinee is required to select the correct option from the various options provided.

In matrix question, the compilable code of the question includes a variable in a question. Some probable values for the variable are also provided with the compilable code in the question. Further, multiple options are provided to the examinee against each value of the variable. These multiple options include a correct option and various incorrect options for each value. The examinee is required to select the correct option against each value of the variable.

In multiple response questions, the questions include more than one correct option, along with the incorrect options. The compilable code of the question includes a variable, and a specific value or a range is provided for the variable to the examinee. The examinee is required to select all the correct options possible for the value or the range of the variable.

In match-the-column questions, the compilable code of the question includes a variable. One or more values are provided to the examinee for the variable. The correct option for each value of a variable is provided in a jumbled manner to the examinee. Various incorrect options may also be provided to the examinee with the jumbled correct options. The examinee is required to match the correct options against each value of the variable.

Question generator tool 104 utilizes the details provided by question data 102 to generate a family of questions for a programming language.

The family of questions includes various questions and their corresponding options. These questions are derived from a compilable code. The following is an exemplary compilable code written in C to generate a family of questions:

```
# include <stdio.h>
  main ( )
  {
      int iNum;
      for(iNum=0;iNum<45;iNum++);
      printf("%d",iNum);
  }
```

Question generator tool 104 automatically generates the family of questions by changing certain values in the compilable code. For example, to form a question, the maximum value of iNum in the code mentioned above can be changed from 45 to 50. Similarly, other questions can be derived from the compilable code, which further changes the value of iNum. In an embodiment of the invention, the parameters for which the values may be modified to generate the questions are defined by a user. In another embodiment of the invention, the parameters for which the values can be modified to generate the questions are dynamically selected by question generator tool 104. In addition to generating questions, question generator tool 104 generates options that correspond to the questions. These options include the correct and incorrect options for the question. The generation of options is explained in detail in conjunction with FIG. 3.

The questions and the corresponding options generated by question generator tool 104 are stored in question bank 106. In an embodiment of the invention, question bank 106 provides questions for an online examination. In another embodiment of the invention, question bank 106 provides questions that can be printed on paper.

Figure 2:
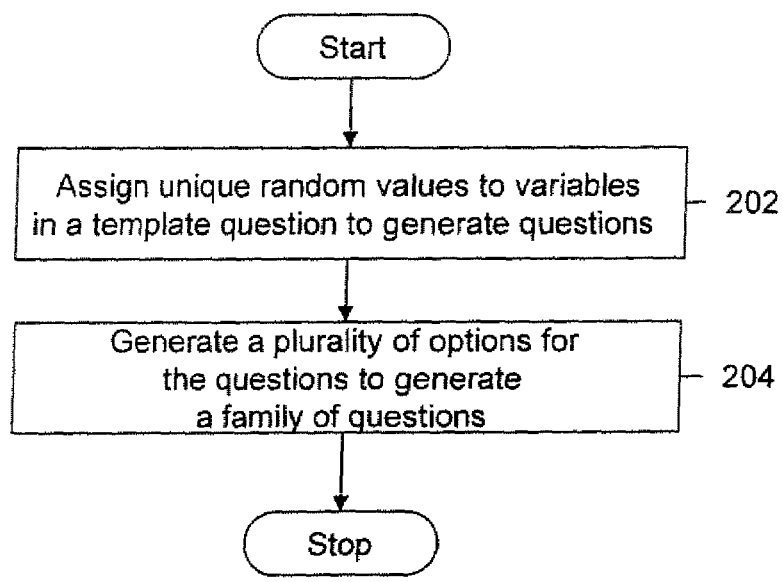
FIG. 2 is a flowchart illustrating a method for generating a family of questions for a programming language, in accordance with an embodiment of the invention.

FIG. 2 is a flowchart illustrating a method for generating the family of questions for a programming language, in accordance with an embodiment of the invention. In various embodiments of the invention, the programming languages may be C, C++, C#, JAVA, UNIX, Visual Basic, VC++, COBOL, FORTRAN, and the like.

The family of questions includes questions and corresponding options for each question. The questions are derived from a pre-defined parent question. The pre-defined parent question also contains a compilable code. The pre-defined parent question is converted to a template question by inserting a variable in the pre-defined parent question. The generation of the template question from the pre-defined parent question is explained in detail in conjunction with FIG. 3.

At 202, a first set of unique random values are assigned to the variable in the template question, to generate the questions. In various embodiments of the invention, the type of variable may be defined as an integer, a floating point, a double floating point, an alphanumeric, and the like.

In an embodiment of the invention, the first set of unique random values may be generated automatically. In another embodiment of the invention, the first set of unique random values may be provided by a user.

At 204, various options are generated for the questions generated at 202. Various options include a correct option and different incorrect options for the compilable code of the questions. In an embodiment of the invention, the correct question may have more than one option for the compilable code. The generation of the correct and incorrect options is explained in detail in conjunction with FIG. 3. The questions, along with their corresponding options, are considered to be a family of questions.

Figure 3A:
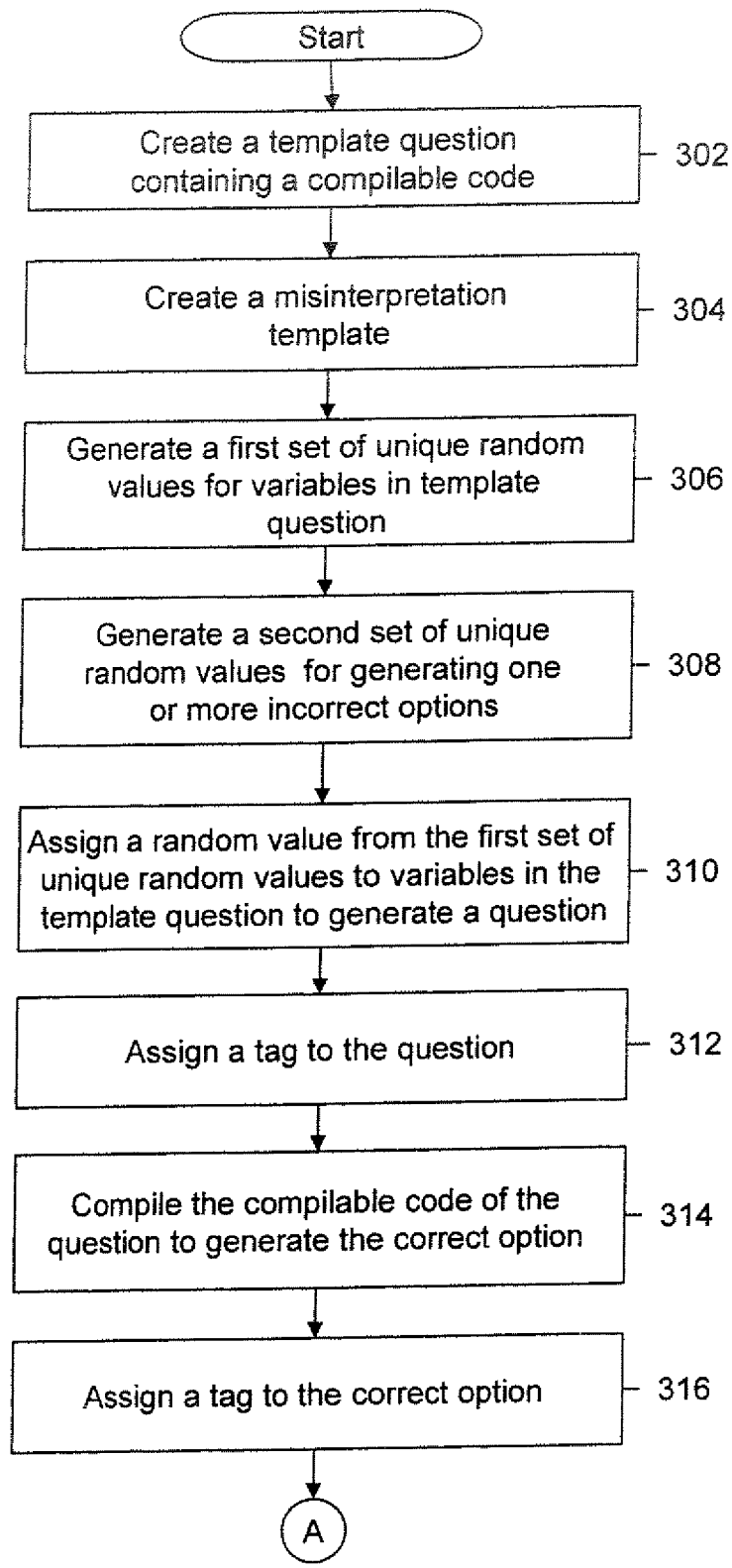
FIG. 3 is a flowchart illustrating a method for generating the family of questions for the programming language, in accordance with the another embodiment of the invention.
Figure 3B:
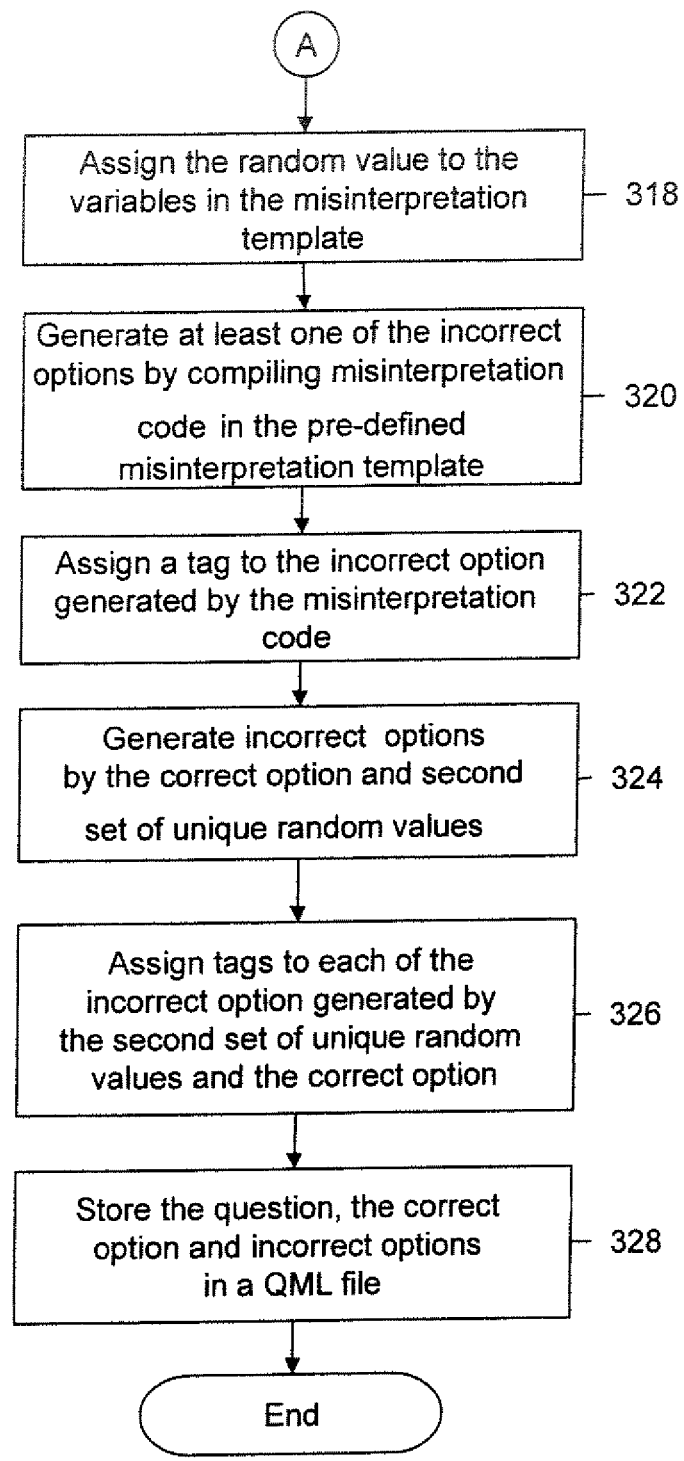

FIG. 3 is a flowchart illustrating a method for generating the family of questions for a programming language, in accordance with another embodiment of the invention. The family of questions includes various questions and the options for each question. The options include the correct and incorrect options for the questions that correspond to the compilation of the compilable code in the question.

At 302, a template question is created. The template question is derived from a pre-defined parent question, which comprises a compilable code.

In an exemplary embodiment of the invention, the pre-defined parent question containing the compilable code is the following:

```
#include<stdio.h>
main( )
{
int iNum=10,iResult=0;
iResult=iNum++;
printf("%d",iNum++);
}
```

The pre-defined parent question is converted to a template question by inserting a variable in the pre-defined parent question. In an embodiment of the invention, the variable in the template question is defined by a user.

For example, the template question derived from the pre-defined parent question mentioned above may be

```
#include<stdio.h>
main( )
{
int iNum=$,iResult=0;
iResult=iNum++;
printf("%d",iNum++);
}
``` where $1 is the variable. In various embodiments of the invention, the type of variable may be defined as an integer, a floating point, a double floating point, an alphanumeric, and the like.

In an embodiment of the invention, more than one variable may be inserted in the pre-defined parent question.

At 304, a misinterpretation template is created. In an embodiment of the invention, the misinterpretation template is created by a user. The misinterpretation template is derived from the template question and contains the misinterpretation code. The misinterpretation code is a wrong interpretation of the compilable code contained in the template question. For example, if the compilable code is

```
#include<stdio.h>
main( )
{
int iNum=2,iResult=0;
iResult=iNum++;
printf("%d",iNum++);
}
``` the correct output of this compilable code is 2. However, an examinee taking an examination may interpret the compilable code incorrectly and consider the output to be 3. Hence, the misinterpretation code for this type of misinterpretation is the following:

```
#include<stdio.h>
main( )
{
int iNum=2,iResult=0;
iResult=++iNum;
printf("%d",++iNum);
}
```

In an embodiment of the invention, more than one misinterpretation template may be provided for each template question.

At 306, a first set of unique random values is generated for the variables in the template question, in accordance with a range defined for the variable. In an embodiment of the invention, the range for the variable is defined by a user. The first set of unique random values is used to generate the questions. In another embodiment of the invention, the first set of unique random values is generated automatically. In yet another embodiment of the invention, the first set of unique random values is provided by the user.

At 308, a second set of unique random values ($k_i$) is generated, in accordance with a tolerance range defined for the incorrect options. In an embodiment of the invention, the tolerance range is defined by a user. The second set of unique random values is used to generate the incorrect options for the questions. In another embodiment of the invention, the second set of unique random values is generated automatically. In yet another embodiment of the invention, the second set of unique random values is provided by the user.

At 310, a random value from the first set of unique random values is assigned to the variable in the template question, to generate a question. In an embodiment of the invention, the random values from the first set are assigned sequentially to generate various questions from the template question. In another embodiment of the invention, the random values are selected randomly from the first set. In various embodiments of the invention, a pre-defined number of questions may be generated by assigning the random values to the variable in the template question. Each random value from the first set of random values is used only once while generating the pre-defined number of questions.

At 312, a tag is assigned to the question generated at 310. Similarly, different tags are assigned to the pre-defined number of questions generated at 310. The tag assigned to the question is used to identify the question.

In various embodiments the question generated after the first set of unique random values are assigned, are stored in a particular format. An example of the format may be, but is not limited to, the, a tagged format, an XML tagged format, a Question Markup Language (QML) format, a Flat File format, and a database.

At 314, the question generated at 310 is compiled to generate an output. This compilation includes compiling the compilable code contained in the question. The output is stored as the correct option for the question. In an embodiment of the invention, the correct output is temporarily stored in a cache memory.

At 316, a tag is assigned to the correct option. This tag is used to identify the correct option. In an embodiment of the invention, the tag is assigned to the correct option that is stored temporarily in a cache memory.

In various embodiments of the invention, the correct option generated after compiling the compilable code contained in the question, are stored in a particular format. An example of the format may be, but is not limited to, the, a tagged format, an XML tagged format, a QML format, a Flat File format, and a database.

At 318, the random value from the first set of unique random values assigned at 310 is assigned to the variable in the misinterpretation template, to form a misinterpreted question. In an embodiment of the invention, the random values from the first set are assigned sequentially to generate various misinterpreted questions from the template question. In another embodiment of the invention, the random values from the first set are selected randomly. In various embodiments of the invention, the pre-defined number of misinterpreted questions may be generated by assigning the random values to the variable in the misinterpretation template. Each random value from the first set of random values is used only once while generating the pre-defined number of misinterpreted questions.

In various embodiments of the invention, the misinterpreted question generated after the first set of unique random values are assigned, along with the misinterpreted code, are stored in a particular format. An example of the format may be, but is not limited to, the, a tagged format, an XML tagged format, a QML format, a Flat File format, and a database.

At 320, the misinterpretation code in the misinterpreted question is compiled to generate an output. This output is stored as the first incorrect option for the question generated at 310. In an embodiment of the invention, the first incorrect option is stored temporarily in a cache memory.

In an embodiment of the invention, more than one misinterpretation template may be created for each question at 304. This results in more than one first incorrect option for the question.

At 322, a tag is assigned to the first incorrect option. This tag is used to identify the first incorrect option. In an embodiment of the invention, the tag is assigned to the first incorrect option that is temporarily stored in a cache memory.

In various embodiments of the invention, the first incorrect option generated after compiling the misinterpretation code in the misinterpreted question, is stored in a particular format. An example of the format may be, but is not limited to, the, a tagged format, an XML tagged format, a QML format, a Flat File format, and a database.

In an embodiment of the invention, different tags may be associated with more than one first incorrect option generated by more than one misinterpretation template.

At 324, a second incorrect option is generated by using a random value from the second set of unique random values ($k_i$) and the correct option generated at 314. In an embodiment of the invention, the second incorrect option generated is stored temporarily in a cache memory.

In an embodiment of the invention, the second incorrect option is calculated by the following formula Second Incorrect Option=Correct Option (+−)$k_i$*α*(correct option)

where α is a value of the tolerance limit. In an embodiment of the invention, the tolerance limit may be defined by a user. In an alternative embodiment of the invention, the tolerance limit may be taken as an input from a user in real time. The values of the tolerance limit may be 1%, 2%, 3%, 4%, and the like. For example, if the correct option corresponding to the question generated at 310 is 2, one of the incorrect options corresponding to the question would be 4, i.e., 2+30*4%*2. Here the value of $k_i$ has been considered as 30 and α as 4%. Similarly, another incorrect option would be 0, i.e., 2−30*4% 2. Further, various other incorrect options can be generated by the second set of unique random values ($k_i$), the tolerance limit value (a) and the correct option.

In an embodiment of the invention, the number of incorrect options to be generated may be defined by a user.

At 326, a tag is assigned to the second incorrect option. The tag associated with the second incorrect option is used to identify the second incorrect option. In an embodiment of the invention, the tag is assigned to the second incorrect option that is stored temporarily in a cache memory.

In various embodiments of the invention, the second incorrect option is stored in a particular format. An example of the format may be, but is not limited to, the, a tagged format, an XML tagged format, a QML format a Flat File format, and a database.

In another embodiment of the invention, different tags may be associated with the incorrect options generated by the formula mentioned above.

At 328, the question, the correct option, the first incorrect option and the second incorrect option are stored in a file with their corresponding tags.

In various embodiments of the invention, the question, the correct option, the first incorrect option and the second incorrect option, are stored in a particular format. An example of the format may be, but is not limited to, the, a tagged format, an XML tagged format, a Question Markup Language (QML) format, a Flat File format, and a database.

In another embodiment of the invention, the tags associated with the options are randomly stored against each question.

Similarly, various questions, with their corresponding options, are generated from the template question. These questions, with their corresponding options, are considered to be a family of questions.

In another embodiment of the invention, various incorrect options for each question may be generated only by compiling the misinterpretation codes in the one or more misinterpretation templates. Similarly, various incorrect options may be generated only by the second set of unique random values and the correct option for each question.

In yet another embodiment of the invention, it is ensured that the random values used to generate options are not repeated during a period of time.

In an alternative embodiment of the invention, all the random values present in the first set of random values are assigned to the template question, to generate multiple questions at one instance. These questions are later complied to generate their corresponding options.

Figure 4:
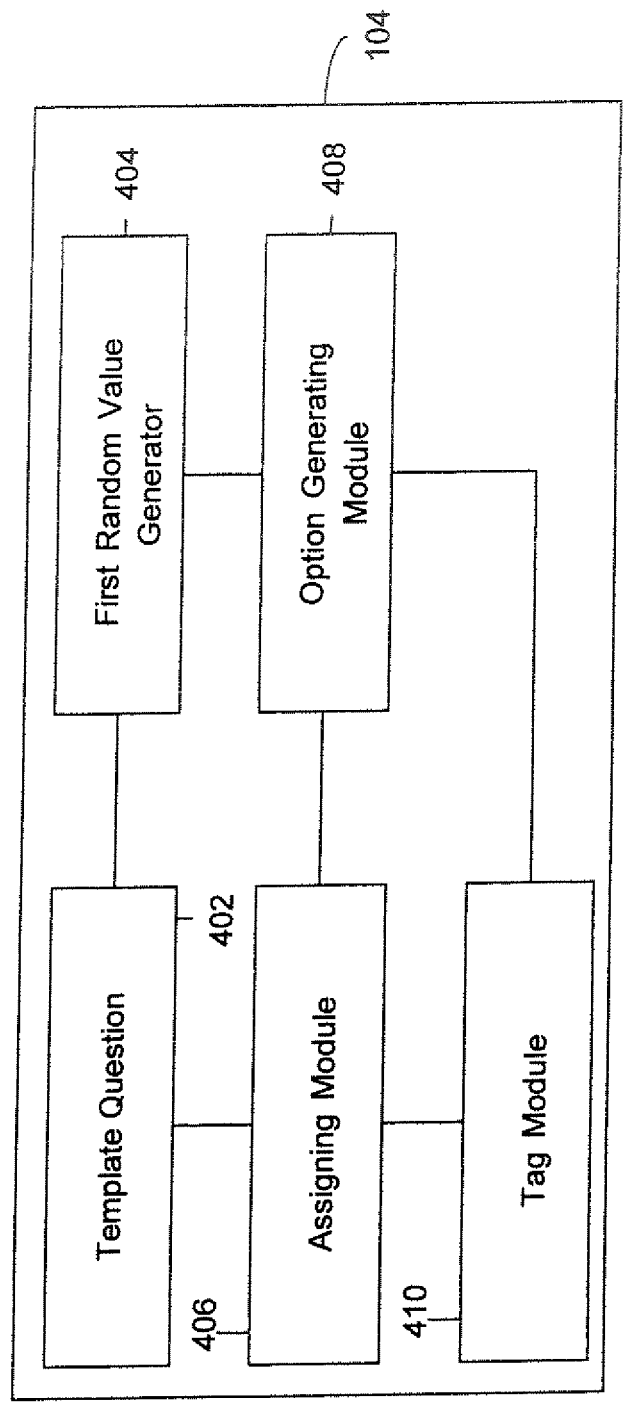
FIG. 4 is a block diagram of a question generator tool, in accordance with an embodiment of the invention.

FIG. 4 is a block diagram of question generator tool 104, in accordance with an embodiment of the invention. Question generator tool 104 includes a template question 402, a first random value generator 404, an assigning module 406, an option generating module 408 and a tag module 410.

Template question 402 includes a compilable code, which contains a variable. In an embodiment of the invention, template question 402 may be defined by a user. In another embodiment of the invention, the variable is defined by a user. In yet another embodiment of the invention, there may be various variables in the compilable code.

Template question 402 is stored in a file, which may be a text file, an MS Word document file, and the like.

First random value generator 404 generates a first set of unique random values, which is generated in accordance with a range defined for the variable. In an embodiment of the invention, the range is defined by a user. First random value generator 404 generates the first set of unique random values for the variable in the template question 402.

Assigning Module 406 assigns a random value from the first set of unique random values to the variable in the template question 402, to generate a question.

Option generating module 408 generates various options for the question. These options may include various correct and incorrect options for the question. This is explained in detail in conjunction with FIG. 5.

Tag Module 410 assigns a respective tag to each of the correct and incorrect options, and stores them in a file. In an embodiment of the invention, the file is stored in a QML format.

Similarly, these modules generate various questions from the template question 402, with their corresponding correct and incorrect options, thereby generating a family of questions.

Figure 5:
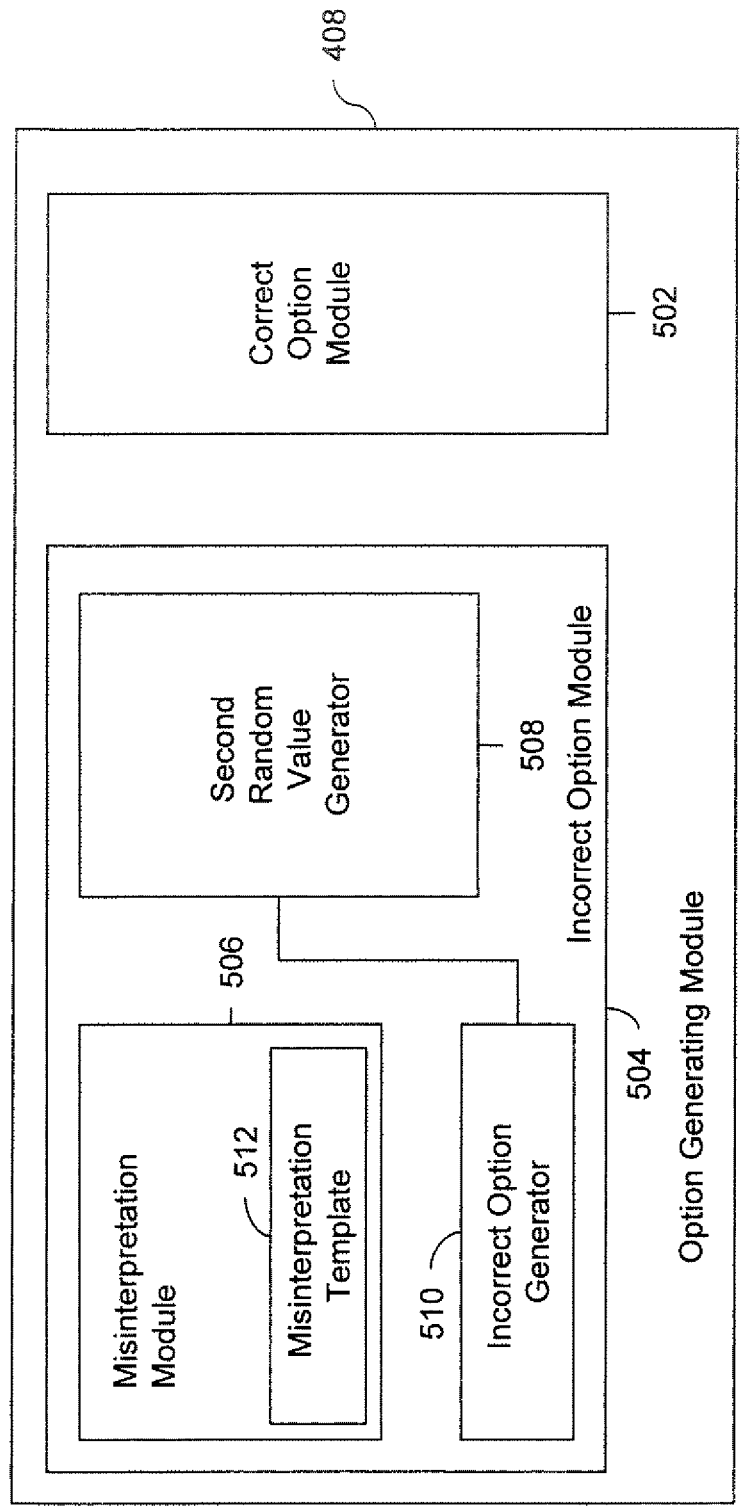
FIG. 5 is a block diagram of an option generating module, in accordance with an embodiment of the invention.

FIG. 5 is a block diagram of option generating module 408, in accordance with an embodiment of the invention. Option generating module 408 includes a correct option module 502 and an incorrect option module 504. Incorrect option module 504 includes a misinterpretation module 506, a second random value generator 508 and an incorrect option generator 510.

Correct option module 502 generates a correct option for a question by compiling a compilable code in the question. The question is derived by assigning a random value from a first set of unique random values to a variable in template question 402. In an embodiment of the invention, more than one correct option may be generated for the question.

Incorrect option module 504 generates various incorrect options for the question. Misinterpretation template 512 contains a misinterpretation code. The misinterpretation code is a misinterpreted form of the compilable code contained in template question 402. Assigning module 406 assigns the random value to the variable in misinterpretation template 512, to form a misinterpreted question. Misinterpretation module 506 generates a first incorrect option for the question by compiling the misinterpretation code in the misinterpreted question.

Second random value generator 508 generates a second set of unique random values, in accordance with a tolerance range defined for the incorrect options. In an embodiment of the invention, the tolerance range is defined by a user. Incorrect option generator 510 generates incorrect options for the question, based on the second set of unique random values and the correct option for the question.

The method, system and computer program product described above have a number of advantages. The method automatically generates a family of questions for a programming language, and enables the generation of an unlimited number of questions for a particular compilable code, without any manual intervention. Further, the method enables the generation of various correct and incorrect options for each question. The incorrect options generated by various methods, such as the misinterpretation method and the random number generation method, help to test an examinee effectively. Further, the method reduces the time taken to generate the questions and eliminates the possibility of duplicate questions being generated.

The computer system comprises a computer, an input device, a display unit and the Internet. The computer comprises a microprocessor, which is connected to a communication bus. Further, the computer includes a memory, which may include Random Access Memory (RAM) and Read Only Memory (ROM). The computer system also comprises a storage device, which can be a hard disk drive or a removable storage drive such as a floppy disk drive, an optical disk drive, etc. Moreover, the storage device can be other similar means for loading computer programs or other instructions into the computer system. Further, the computer system includes a communication unit, which enables the computer to connect to other databases and the Internet through an I/O interface. Furthermore, the communication unit enables the transfer and reception of data from other databases. The communication unit may include a modem, an Ethernet card, or any other similar device that enables the computer system to connect to databases and networks such as LAN, MAN, WAN and the Internet. The computer system facilitates inputs from a user through an input device that is accessible to the system through an I/O interface.

The computer system executes a set of instructions that is stored in one or more storage elements, to process input data. The storage elements may also hold data or other information, as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. Processing of input data by the processing machine may be in response to users' commands, the result of previous processing, or a request made by an alternative processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

The invention claimed is:

1. A computer-implemented method for creating a family of programming language test questions, the method comprising:

generating the family of programming language test questions, each question in the family including a question body to be presented to a test taker and a plurality of response options to be correspondingly presented to the test taker, the question body comprising a segment of compilable program code, and at least one of the response options representing an outcome of execution of the segment of compilable program code, the step of generating comprising using at least one processor for:

a. storing in a memory, a pre-defined parent question comprising a first segment of compilable program code written in the programming language;

b. generating a template question comprising a second segment of compilable program code, by inserting one or more user-defined variables in the first segment of compilable program code of the pre-defined parent question;

c. generating a first question body for a first question in the family of questions, the first question body comprising a third segment of compilable program code generated by assigning a first set of unique random values to the one or more user-defined variables in the second segment of compilable program code of the template question; and d. generating a first plurality of response options corresponding to the first question, the first plurality of response options comprising at least one correct option and at least one incorrect option, wherein the at least one correct option is generated by a compiler program and is based on a compiler program input comprising the third segment of code; and wherein the at least one incorrect option is generated by compiling one or more misinterpretation codes, a misinterpretation code being generated by:

generating a fourth segment of compilable program code, wherein the fourth segment of compilable program code includes (i) a first program statement that is also included within the second segment of compilable program code, and (ii) a second program statement that is not included within the second segment of compilable program code; and assigning the first set of unique random values corresponding to the third segment of compilable program code, to one or more variables within the fourth segment of compilable program code.

2. The method according to claim 1 further comprising generating the first set of unique random values for the one or more user-defined variables.

3. The method according to claim 1, wherein the at least incorrect option is generated based on at least one of the correct option and a second set of unique random values, the second set of unique random values being defined by the user.

4. The method according to claim 1 further comprising assigning one or more tags to one or more of the at least one correct option, the at least one incorrect option and each of the family of programming language test questions, the one or more tags being assigned based on the first set of unique random values for storing the family of programming language test questions.

5. A system for automatically creating a family of questions for a programming language, the system comprising a processor coupled to a memory, the processor being configured to generate a family of programming language test questions, each question in the family including a question body to be presented to a test taker and a plurality of response options to be correspondingly presented to the test taker, the question body comprising a segment of compilable program code, and at least one of the response options representing an outcome of execution of the segment of compilable program code, wherein the processor is configured to generate the family of questions by executing the following tasks:

a. storing in the memory, a pre-defined parent question comprising a first segment of compilable program code written in the programming language;

b. generating a template question comprising a second segment of compilable code by inserting one or more variables in the first segment of compilable program code, the one or more variables being defined by a user;

c. generating a first question body for a first question in the family of questions, the first question body comprising a third segment of compilable program code generated by assigning a first set of unique random values to the one or more variables in the second segment of compilable program code of the template question; and d. generating a first plurality of response options corresponding to the first question, the first plurality of response options comprising at least one correct option and at least one incorrect option, wherein the at least one correct option is generated by a compiler program and is based on a compiler program input comprising the third segment of code; and wherein the at least one incorrect option is generated by compiling one or more misinterpretation codes, a misinterpretation code being generated by:

generating a fourth segment of compilable program code, wherein the fourth segment of compilable program code includes (i) a first program statement that is also included within the second segment of compilable program code, and (ii) a second program statement that is not included within the second segment of compilable program code; and assigning the first set of unique random values corresponding to the third segment of compilable program code, to one or more variables within the fourth segment of compilable program code.

6. The system according to claim 5 wherein the processor is further configured to generate the first set of unique random values for the one or more variables.

7. The system according to claim 5, wherein the processor is configured to generate one or more of the at least one incorrect option based on at least one of the correct option and a second set of unique random values, the second set of unique random values being defined by the user.

8. The system according to claim 7, wherein the processor is further configured to generate the second set of unique random values, the second set of unique random values being defined by the user.

9. The system according to claim 5, wherein the processor is further configured to assign one or more tags to one or more of the at least one correct option, the at least one incorrect option and each of the family of programming language test questions, the one or more tags being assigned based on the first set of unique random values for storing the family of programming language test questions.

10. A computer program product for use with a computer, the computer program product comprising a non-transitory computer usable medium having a computer readable program code embodied therein for creating a family of programming language test questions, the computer readable program code comprising instructions for:

generating the family of programming language test questions, each question in the family including a question body to be presented to a test taker and a plurality of response options to be correspondingly presented to the test taker, the question body comprising a segment of compilable program code, and at least one of the response options representing an outcome of execution of the segment of compilable program code, the step of generating comprising:

a. storing in a memory, a pre-defined parent question comprising a first segment of compilable program code written in the programming language;

b. generating a template question comprising a second segment of compilable program code by inserting one or more user-defined variables in the first segment of compilable program code of the pre-defined parent question;

c. generating a first question body for a first question in the family of questions, the first question body comprising a third segment of compilable program code generated by assigning a first set of unique random values to the one or more variables in the second segment of compilable program code of the template question; and d. generating a first plurality of response options corresponding to the first question, the first plurality of response options comprising at least one correct option and at least one incorrect option, wherein the at least one correct option is generated by a compiler program and is based on a compiler program input comprising the third segment of code; and wherein the at least one incorrect option is generated by compiling one or more misinterpretation codes, a misinterpretation code being generated by:

generating a fourth segment of compilable program code, wherein the fourth segment of compilable program code includes (i) a first program statement that is also included within the second segment of compilable program code, and (ii) a second program statement that is not included within the second segment of compilable program code; and assigning the first set of unique random values corresponding to the third segment of compilable program code, to one or more variables within the fourth segment of compilable program code.

11. The computer readable program code according to claim 10, wherein the at least one incorrect option is generated based on at least one of the correct option and a second set of unique random values, the second set of unique random values being defined by the user.

12. The computer readable program code according to claim 10 further performing assigning one or more tags to at least one of the correct option corresponding to each of the one or more questions, the one or more incorrect options corresponding to each of the one or more questions and each of the one or more questions, the one or more tags being assigned based on the first set of unique random values for storing the family of questions.

* * * * *